Aug. 22, 1950  A. A. PEDU, JR  2,519,927
BEARING MOUNTING
Filed March 13, 1947
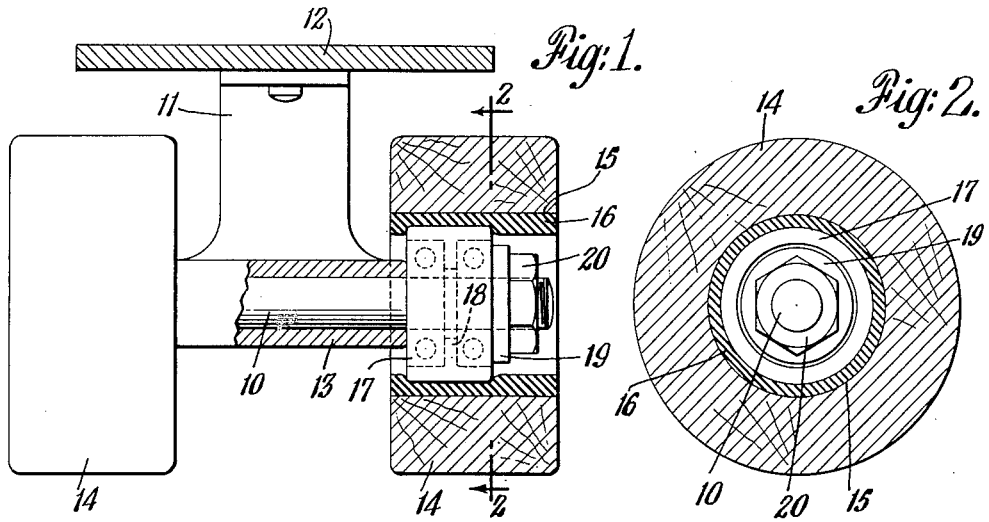
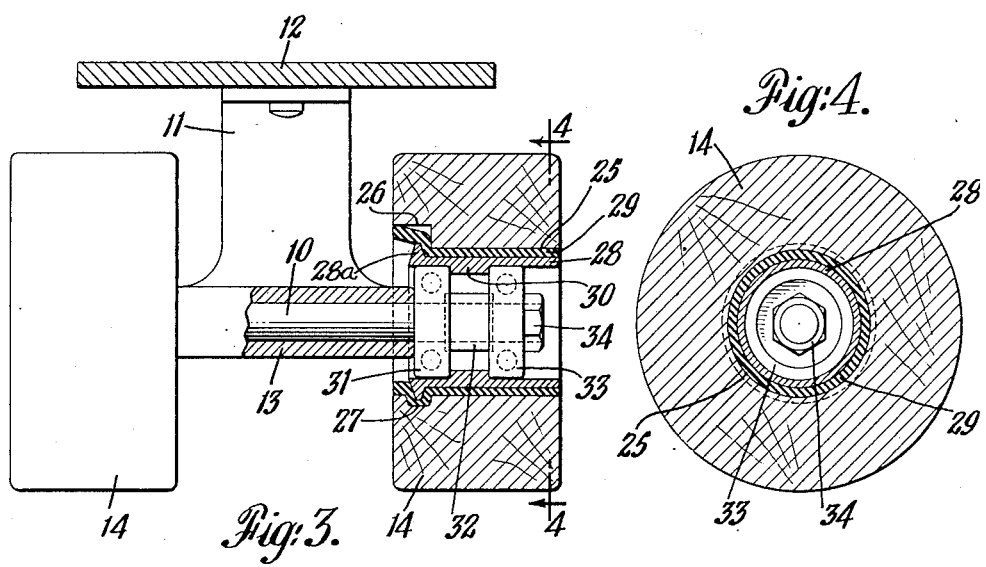
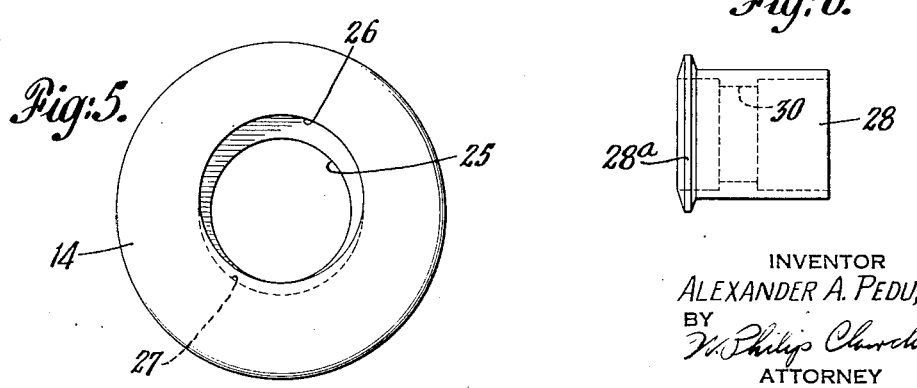
INVENTOR
ALEXANDER A. PEDU, JR.
BY
ATTORNEY Patented Aug. 22, 1950

2,519,927

UNITED STATES PATENT OFFICE 2,519,927

BEARING MOUNTING

Alexander A. Pedu, Jr., Garden City, N. Y.

Application March 13, 1947, Serial No. 734,338

5 Claims. (Cl. 301—5.7)

This application is a continuation-in-part of my application Serial No. 624,982, filed October 27, 1945, now abandoned.

This invention relates to the mounting of a bearing member or support in a wheel and is particularly adapted for use in the construction of wooden roller skate wheels.

One object of my invention is to provide a floating mounting for a bearing support or member in a wheel, such as a wooden roller skate wheel, and at the same time to maintain the bearing securely in the wheel.

A further object of the invention is to provide a rubber mounting for such a bearing support or member in a wheel without any rigid connection therebetween but with the parts so interlocked as to avoid disengagement under any normal stresses.

Another object of the invention is to provide such a mounting for a bearing in which the rubber is sufficiently compressed to provide for substantial expansion or contraction of the parts without running the risk of the parts breaking or becoming disengaged.

Other objects and advantages of the invention will be explained and will be more apparent from the following description of two embodiments of my invention illustrated in the accompanying drawings, in which:

Fig. 1 is a front elevational view, partly in section, of an assembled pair of roller skate wheels embodying one form of my invention.

Fig. 2 is a vertical sectional view through one of these wheels taken about on the line 2—2 of Fig. 1.

Fig. 3 is a front elevational view, partly in section, of an assembled pair of roller skate wheels showing another and preferred embodiment of my invention.

Fig. 4 is a vertical sectional view through one of the wheels in Fig. 3 taken about on the line 4—4 of Fig. 3.

Fig. 5 is a side elevational view of a wooden shell of the type shown in Fig. 3 and as viewed from the inside of the assembled wheel.

Fig. 6 is a side elevational view of a metal support or bearing member used in the assembly of Fig. 3.

In the embodiment of my invention illustrated in Figs. 1 and 2, numeral 10 indicates an axle rigidly secured in a frame or bracket 11 attached to the plate 12 of a roller skate. The ends of the axle 10 projecting outwardly from the hub 13 of the bracket 11 carry a pair of wooden wheel shells 14, 14, the mounting of one of which is illustrated in detail. The wooden shells 14 are each provided with a central opening 15 in which is placed and secured a sleeve 16 of soft rubber. The sleeve 16, preferably extending the full width of the wheel 14, has pressed into it a metal bearing member 17 which, in this case, forms the outer race of a double ball bearing race assembly. Bearing member 17 is proportioned in size with respect to the opening 15 so that it produces substantial compression of the rubber 16 between its outer surface and the inner surface of the opening 15. Preferably, the bearing member 17 is formed with a central inwardly projecting flange 18, thereby providing inside the member 17 a pair of annular tracks in which the balls may be mounted, the bearing member serving as the outer race. An inner race may be placed on the axle and clamped between the hub 13 and the washer 19 by means of the nut 20 applied to the end of the axle, thus completing the assembly.

By compressing the rubber sleeve 16 to a substantial degree intermediate the ends thereof, a floating bearing is provided that is reasonably secure although it may be desirable to hold the parts together by cement, glue or other suitable means.

A preferred form of my invention is illustrated in Figs. 3 to 6, in which an axle 10 is likewise fixed in the hub 13 of a frame or bracket 11 attached to the plate 12 of a skate. In this case, however, the wooden shell 14 has a central opening 25 extending all the way through it and is provided with another opening 26 extending only a small portion of the way through the shell and disposed eccentric and approximately tangent to the main opening 25. The portion of the larger opening 26 that is tangent to the central opening 25 is undercut to form an arcuate groove 27 having a maximum depth opposite the point of tangency of the two openings.

In this case, any suitable bearing member or support 28, which may be formed of steel, alluminum alloy, or any other suitable material, is used and is preferably provided on one end with an outwardly extending projection such as the collar 28a. Here again, a plain sleeve 29 of relatively thick, soft rubber, such as used in connection with the first embodiment, is placed in the opening 25 of the shell 14. The metal bearing member or support 28 is then pressed into this opening compressing the rubber and is tilted toward the larger part of the opening 26 to permit the collar 28a to enter the opening 26, in spite of the resistance of the rubber. As the collar 28a reaches the groove 27, the sleeve 28 snaps over into a position concentric with the shell and by pressing the rubber into groove 27 becomes interlocked with the shell in such a manner that removal of the support 28 is virtually impossible without the use of tremendous force or the virtual destruction of one or more parts.

It will be apparent that the support 28 in this case is completely supported in rubber throughout its circumference and is not in rigid contact with the shell at any point. With this construction it is unnecessary to use any adhesive or provide for other means of bonding the rubber either to the wood or metal of its associated parts.

In assembling the parts of my preferred bearing mounting, I have found that it is desirable to use a rubber sleeve 29 having an outer diameter somewhat larger than the inner diameter of the opening 25, and having an inner diameter approximately the same as the outer diameter of the bearing support 28. Thus, the rubber sleeve may be partially folded longitudinally and easily slipped into the opening 25. The bearing support is then easier to force into the opening inside the rubber. Even with this method of assembly, however, it may be desirable to apply lubricant of some kind to the outer surface of support 28 before pressing it into position. The excess rubber projecting from the assembled wheel may, of course, be trimmed off to present a neat appearance.

While the bearing member 28 may be of any desirable construction internally, it is shown as having an inwardly extending shoulder 30 formed nearer to the collar end of the sleeve than to the other end. Separate assembled ball bearing race units may thus be used for mounting the wheel on the axle 10. This is readily done by first placing the race assembly 31 on the axle, then placing the wheel over the race assembly 31, as shown in Figs. 1 and 2, and applying in succession over the end of the axle a spacer sleeve 32, a second ball bearing race assembly 33 and securing the whole in position by screwing on the nut 34. Preferably, the spacer sleeve 32 is slightly longer than the shoulder 30, so that when the nut 34 is tightened, the inner races or portions of the race assemblies 31 and 33 are clamped securely against the hub 13.

The bearing mountings of my invention may be applied to wheels made of metal, plastics or other material, but are particularly useful in the construction of wooden wheels because they permit the use of wood shells that are still green, and avoid any danger of cracking or the wood becoming loosened. Thus, the bearing remains not only floating but tight under all atmospheric conditions, and both axial and radial shock from the wheel are absorbed by the rubber due to the fact that the bearing members have no rigid contact with the shell of the wheel.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A wheel having a central opening, another opening extending only part way through said wheel and eccentric to said central opening, the portion of said second opening nearest said central opening being undercut to form an arcuate groove, a rubber sleeve in said central opening, and a bearing member having a collar at one end pressed into said sleeve so that said collar forces rubber of the sleeve into said groove.

2. A wheel as defined in claim 1 in which the main portion of the wheel is wood and the bearing member is a metal sleeve of generally cylindrical shape.

3. A roller skate wheel comprising a wooden shell having a central opening therethrough, a groove formed in said opening near one end thereof, a sleeve of compressible rubber in said opening, and a rigid bearing member pressed into said opening inside said sleeve and compressing said rubber, said member having a projection near one end that forces said rubber into said groove.

4. A wheel having a central opening, a soft rubber sleeve therein, and a bearing member inside said sleeve and pressed into said wheel opening with the rubber under substantial compression between the surfaces of said opening and bearing member, said wheel opening and bearing member being formed near one end thereof with an integral cooperating flange on one and a groove in the other which are firmly interlocked with compressed rubber therebetween and thereby prevent axial displacement of the bearing member, said flange and groove being of such proportions that they snap into interlocking engagement when the bearing member is pressed into said wheel opening.

5. A wheel having a central opening, a soft rubber sleeve therein, and a bearing member inside said sleeve and pressed into said wheel opening with the rubber under substantial compression between the surfaces of said opening and bearing member, said member having an outwardly projecting flange near one end and said wheel opening having a cooperating groove firmly interlocked with said flange with compressed rubber therebetween, said flange and groove being of such proportions that they snap into interlocking engagement when the bearing member is pressed into said wheel opening.

ALEXANDER A. PEDU, JR.

REFERENCES CITED

The following references are of record in the file of this patent:

UNITED STATES PATENTS

| Number | Name | Date |
|---|---|---|
| 165,587 | Jeantaud | July 13, 1875 |
| 698,110 | Foy | Apr. 22, 1902 |
| 1,795,321 | Baldwin | Mar. 10, 1931 |
| 1,827,267 | Short | Oct. 13, 1931 |
| 2,238,435 | Perry | Apr. 15, 1941 |